Oct. 10, 1961 R. C. RIKE 3,003,591
SELF-CENTERING ARRANGEMENT FOR BRAKE SHOES
Filed Oct. 28, 1959 2 Sheets-Sheet 1

INVENTOR.
Richard C. Rike
BY
D. C. Staley
His Attorney

Oct. 10, 1961  R. C. RIKE  3,003,591
SELF-CENTERING ARRANGEMENT FOR BRAKE SHOES
Filed Oct. 28, 1959  2 Sheets-Sheet 2

INVENTOR.
Richard C. Rike
BY
His Attorney

United States Patent Office 3,003,591
Patented Oct. 10, 1961

3,003,591
SELF-CENTERING ARRANGEMENT FOR
BRAKE SHOES
Richard C. Rike, Dayton, Ohio, assignor to General
Motors Corporation, Detroit, Mich., a corporation of
Delaware
Filed Oct. 28, 1959, Ser. No. 849,299
6 Claims. (Cl. 188—78)

This invention relates to friction type drum brakes used on motor vehicles. More particularly, the invention relates to a drum brake of the duo-servo type wherein the brake shoe means has adjacent cooperating ends of the brake shoes engaging anchor means on which the brake shoe means is adapted to pivot.

Such friction type drum brakes have conventionally consisted of a pair of brake shoes having adjacent cooperating ends of the shoes engaging an anchor pin carried by the backing plate for the brakes whereby the brake shoes are pivotally supported on the anchor pin. The opposite cooperating adjacent ends of the pair of brake shoes engage an adjusting device for adjusting the position of the brake shoes relative to the brake drum carried on the wheel of the vehicle. Retraction springs are provided between the pair of brake shoes and the anchor pin normally to hold the adjacent cooperating ends of the brake shoes in engagement with the anchor pin when the brake is in released position.

In a friction type drum brake having the pair of brake shoes suspended from the anchor pin it is conventional to provide a plurality of planar support areas on the backing plate for the brake assembly on which the rims of the brake shoes rest. Usually three support areas are provided for each brake shoe arranged in a common plane, the brake shoes being held in engagement with the support areas by resilient spring means urging the rims of the brake shoes into engagement with the support areas.

Over the years, there has been a constant problem of wear of the brake shoes on one wheel of a vehicle at a greater rate than on the other wheels of the vehicle. The problem was not related to any particular vehicle wheel or to any particular vehicle, but spasmodically, and in rather substantial numbers, vehicles would be found wherein one brake shoe was worn considerably more than the other brake shoes even though apparently operating under exactly the same conditions.

It has been considered that when a pair of brake shoes are suspended from an anchor pin, when the brake shoes are in released condition, the brake shoes would tend to self-center relative to the backing plate and relative to the brake drum. It has now been found, however, that apparently this previous assumption is not true since it has been discovered that spasmodically the brake shoes of one wheel of a vehicle will hang up on the support areas and cause the brake lining to drag on the brake drum.

This dragging condition occurring spasmodically on the wheels of vehicles is apparently the result of frictional engagement of the rims of the brake shoes with the support areas which may be rough at the time of manufacture or become rough after usage in the field to such an extent the retraction springs, while retaining the adjacent cooperating ends of the brake shoes in engagement with the anchor pin, have no effect to center the brake shoes relative to the brake drum to avoid the drag condition of the brake lining on the drum when the engagement areas between the brake shoe rim and the support areas reach a certain stage of roughness.

It has been found that the dragging condition of the brake shoes on the drum is even more pronounced on turnpike-type of roads where there is insufficient roughness to cause a bouncing of the brake shoes sufficiently constantly to keep them out of engagement with the drum.

It is therefore an object of this invention to provide a friction-type drum brake wherein the brake shoes have adjacent cooperating ends engaging an anchor pin to suspend the brake shoes from the anchor pin, and wherein the support pad areas on the backing plate engaged by the edges of the brake shoes for support thereon have their planar faces tilted angularly toward the central area or the axis of the backing plate whereby the support pad areas provide a plurality of radially positioned angularly disposed planar surfaces which tend to shift the brake shoe assembly always toward a position concentric with the axis of the backing plate and therefore concentric with the axis of a brake drum in operative association with the backing plate.

Further objects and advantages of the present invention will be apparent from the following description, reference being had to the accompanying drawings wherein preferred embodiments of the present invention are clearly shown.

Figure 1:
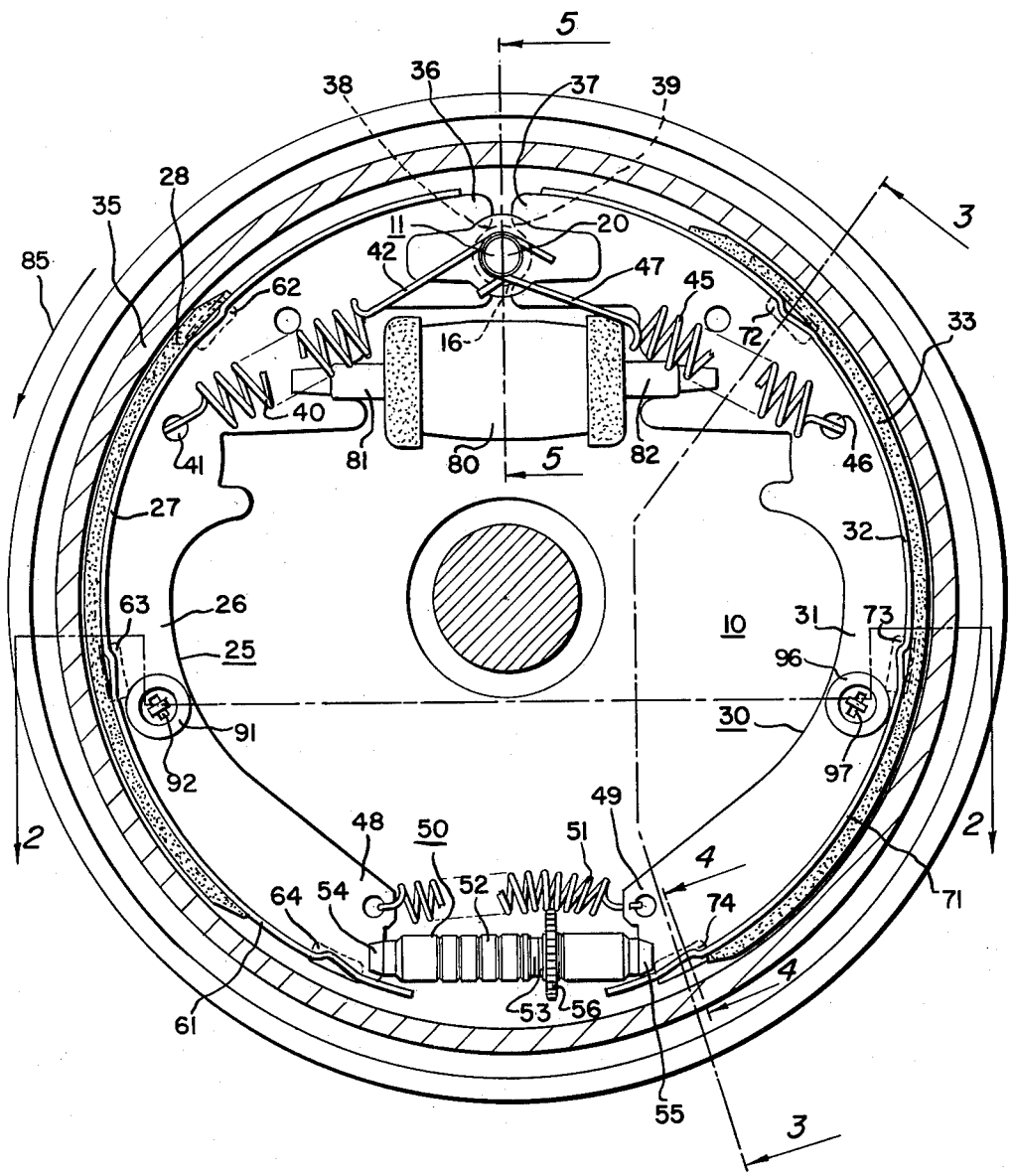
FIG. 1 is a vertical cross-sectional view through a brake drum and brake assembly incorporating features of this invention.

In this invention the brake assembly consists of a backing plate 10 having an anchor means secured thereon in the form of an anchor pin 11. The anchor pin 11 has an enlarged body portion 12 forming a shoulder 13 and a shoulder 14, the shoulder 14 engaging the backing plate reinforcement 10a with the reduced diameter portion 15 extending through the backing plate and being swaged over to retain the anchor pin on the backing plate. A reduced diameter portion 16 on the anchor pin 11 extends forwardly of the shoulder portion 13 and has a second forwardly extending reduced diameter portion 17 forming a shoulder 18 on the forward face of the portion 16. A reduced diameter portion 19 projects forwardly from the portion 17 and has an enlarged head 20 thereon.

Figure 2:
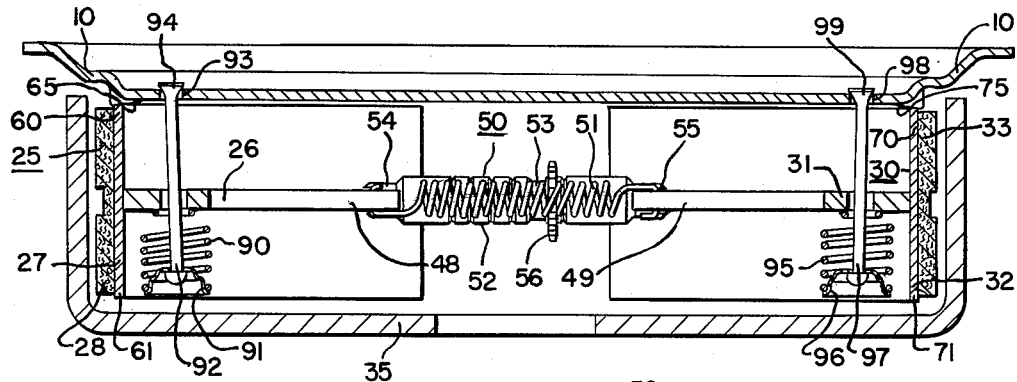
FIG. 2 is a transverse cross-sectional view taken along line 2—2 of FIG. 1 illustrating engagement of the edges of the brake shoes with angularly disposed support pad areas on the backing plate.

The brake assembly includes the two brake shoes 25 and 30. The brake shoe 25 has the web portion 26 secured to the brake shoe 27 on which the brake lining 28 is suitably secured. Similarly, the brake shoe 30 has the web portion 31 secured to the shoe portion 32 on which the brake lining 33 is suitably secured. As illustrated in FIG. 2, the brake shoe webs 26 and 31 and the brake shoe portions 27 and 32 are arranged in the form of a T-shaped structure. The brake shoes 25 and 30 are disposed within the brake drum 35 suitably secured to a wheel of a vehicle in any conventional manner.

The upper adjacent ends 36 and 37 of the brake shoes 25 and 30 respectively have arcuate recesses 38 and 39 respectively formed in the terminus ends of the web portions 26 and 31 that engage the reduced diameter portion 16 of the anchor pin 11, as shown in FIG. 1.

A retraction spring 40 has one end thereof fastened in an opening 41 in the brake shoe web 26 and the opposite end 42 positioned over the reduced diameter portion 19 of the anchor pin 11, as shown in FIG. 1. Similarly, a retraction spring 45 has one end thereof in the opening 46 of the brake shoe web 31 with the opposite end 47 positioned over the reduced diameter portion 19 of the anchor pin 11. When the brake shoes are in retracted position, the end portions 36 and 37 of the web portions 26 and 33 of the respective brake shoes are held in engagement with the anchor pin 11 by the retraction springs 40 and 45, as shown in the drawings, whereby the anchor pin 11 forms a pivot axis on which the brake shoes 25 and 30 can pivot.

The opposite cooperating adjacent ends 48 and 49 of the brake shoe webs 26 and 31 engage an adjusting device 50 and are held in engagement with opposite ends of the adjusting device by the tension spring 51. The adjusting device 50 consists of an internally threaded body 52 receiving the externally threaded body 53. The body 52 has a slotted end 54 that receives the end 48 of the web 26 and the body 53 has a slotted end 55 that receives the end 49 of the web 31. A star wheel 56 that is part of the externally threaded body 53 rotates the body 53 relative to the body 50 to provide extension or retraction of the adjusting device and thereby adjusts the clearance between the brake shoe linings 28 and 33 and the brake drum 35.

The brake shoe 27 has the rim edges 60 and 61, the rim edge 60 being disposed adjacent the backing plate 10. To dispose the brake shoe assembly 25 in planar position relative to the backing plate, the backing plate is provided with brake shoe support pad areas 62, 63 and 64 positioned along the periphery of the shoe edge 60 on which the shoe edge 60 rests. These support pad areas 62, 63 and 64 each have a planar face 65, as shown in FIG. 2, whereby the edge 60 of the brake shoe assembly 25 can slide peripherally as well as transversely of the backing plate and relative to the brake drum 35.

Similarly, the brake shoe assembly 30 has the brake shoe 32 provided with the rim edges 70 and 71. A plurality of brake shoe pad areas 72, 73 and 74 are provided around the periphery of the brake shoe 32 on which the brake shoe edge rests. Each of the brake shoe pad areas 72, 73 and 74 have a planar face 75 engaged by the edge 70 of the brake shoe 32 whereby the brake shoe assembly 30 can move peripherally as well as transversely of the backing plate 10 and relative to the brake drum 35.

A hydraulically operated wheel cylinder 80 has plungers 81 and 82 extending from opposite ends thereof into engagement with the brake shoe webs 26 and 31 respectively whereby admission of hydraulic fluid under pressure into the wheel cylinder 80 forces the plungers 81 and 82 outwardly relative to the cylinder 80 to effect engagement of the brake linings 28 and 33 with the brake drum 35. In normal operation, the brake shoe assemblies 25 and 30 are held in the position shown in FIG. 1 with the cooperating adjacent ends 36 and 37 in engagement with the reduced diameter portion 16 of the anchor pin 11. When hydraulic fluid under pressure is delivered to the wheel cylinder 80 from the master cylinder as a result of movement of the brake pedal by the operator, plungers 81 and 82 move outwardly relative to the cylinder 80 to move the brake linings 28 and 33 into engagement with the brake drum. If the brake shoe assembly is perfectly centered on the axis of the brake drum, both brake shoes will move outwardly substantially the same distance until the brake linings engage the drum with the adjacent ends 36 and 37 of the webs 26 and 31 disengaging from the anchor pin 11.

However, with the rotation of the wheel being in the direction of the arrow 85, the primary brake shoe 25 drives the secondary brake shoe 30 rotationally until the end 37 of the brake shoe web 31 engages the anchor pin 11, the end 36 of the brake shoe web 26 moving away from the anchor pin in a counterclockwise direction. As pressure is applied to the brake shoes by further application of fluid pressure through the wheel cylinder 80, the primary brake shoe 25 drives the secondary brake shoe 30 with a servo action to increase the braking force developed between the secondary brake shoe and the brake drum. This is a conventional duo servo type of brake action.

On release of the brake pedal by the operator of the vehicle, hydraulic pressure in the brake line connected with the wheel cylinder 80 will decay so that the retraction springs 40 and 45 will return the ends 36 and 37 of the brake shoe webs 26 and 31 into engagement with the anchor pin 11. Of course, with the rotation being in the direction of the arrow 85, the web end 37 will already be in engagement with the anchor pin 11, but the web end 36 is now brought into engagement with the anchor pin.

There has been an assumption in the art that in a servo type of brake as disclosed herein, the brake shoe assembly consisting of the two shoes 25 and 30 will some way become centered relative to the brake drum after a brake application. However, this has not been consistently true as it has been found over the years that one brake lining or the other, that is primary or secondary, and particularly the secondary lining, will wear and char badly even though the brakes are in apparent released condition. The difficulty has not been related to any particular wheel of a vehicle or to any particular brake lining material, but rather the difficulty has shown itself spasmodically and rather frequently in various vehicles at various times under various conditions.

To prevent the brake shoe assemblies 25 and 30 from rattling inside the brake drum, a hold-down spring 90 is provided between the web 26 of the brake shoe 25 and the spring retainer 91 held on the end of a pin 92 that has its opposite end extending through a hole 93 in the backing plate 10 and prevented from being pulled through the backing plate by the enlarged head 94. The hold-down spring 90 therefore retains the rim edge 60 of the brake shoe 25 constantly in engagement with the brake shoe support pads 62, 63 and 64. Thus, whenever a brake application is made, the rim edge 60 of the brake shoe 25 moves over the planar faces of the pad areas 62, 63 and 64 both rotationally relative to the backing plate and transversely thereof, constantly scraping the surfaces of the brake shoe pads.

Similarly, the brake shoe assembly 30 has the hold-down spring 95 positioned between the web 31 of the brake shoe 30 and the spring retainer 96 held on one end of the pin 97 that has the opposite end extending through a hole 98 in the backing plate 10 and prevented from being pulled through the hole by the enlarged head 99.

It will, therefore, be seen that the rim edge 70 of the brake shoe 30 will also constantly be held in engagement with the brake shoe pad areas 72, 73 and 74 and will scrape over the pad areas on any brake application. Due either to roughness of the brake shoe rim edges 60 and 70 or to roughness created by scraping of these rim edges over their cooperating support pad areas in operation of the brake, there is sufficient roughness created either on the rim edges or on the faces of the support pad areas that results in the brake shoes 25 and 30 "hanging up" after a brake application in a position that is not concentric with the axis of the brake drum. It will be appreciated that during the brake application the secondary shoe 30 is driven against the brake drum in a right-hand direction, as viewed in FIG. 1, so that when the brake release occurs if there is any tendency for the brake shoes to "hang up" on the brake support pad areas, particularly in regard to the secondary shoe, the primary shoe will move in a right-hand direction to return the end 36 of the web 26 into engagement with the anchor pin 11, but the brake lining 33 on the secondary brake shoe 30 will still remain in engagement with the brake drum 35.

Only as a result of jouncing of the vehicle over a rough road will the secondary brake shoe be moved away from the brake drum, and in many instances, even this is insufficient to produce the desired action of effecting disengagement of the secondary brake shoe from the brake drum. In fact, driving over turnpike-type of roads, with very little resultant jounce of the wheel system, can cause either the primary or secondary shoe to creep into engagement with the brake drum, and this has been proven to be a factual situation.

Figure 4:
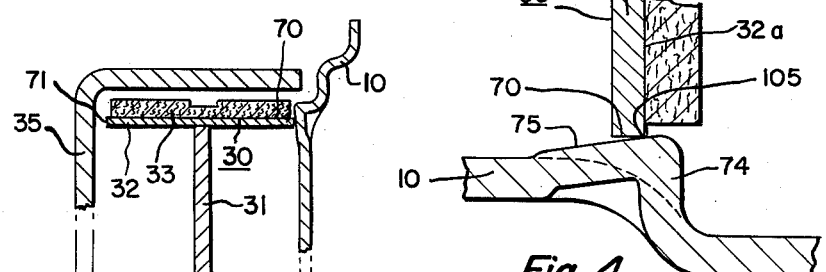
FIG. 4 is an enlarged cross-sectional view taken along line 4—4 of FIG. 1.
Figure 5:
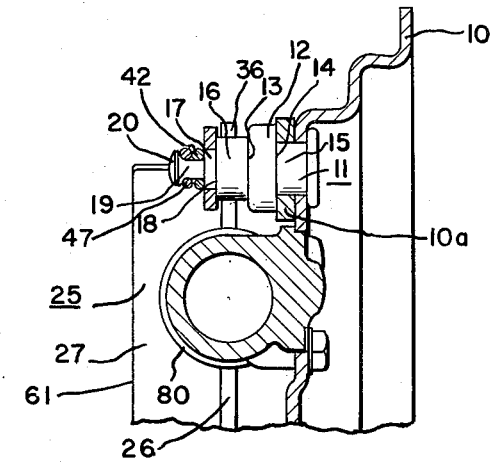
FIG. 5 is a vertical cross-sectional view taken along line 5—5 of FIG. 1.
Figure 3:
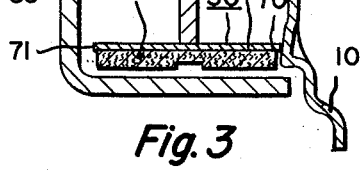
FIG. 3 is a transverse cross-sectional view taken along line 3—3 of FIG. 1.

In this invention therefore each of the support pad areas 62, 63, 64, 72, 73 and 74 has its planar face 65 or 75 respectively disposed angularly toward the central area of the backing plate 10 and on a radius, or radial, of the axis of the backing plate, as shown in FIGS. 2 and 3, and more particularly as shown in the enlarged cross-sectional view of FIG. 4, which illustrates the support pad 74 for the brake shoe rim edge 70 with the planar face 75 of the support pad area disposed in the aforementioned angular relationship relative to the backing plate 10.

As will be more particularly noted in FIG. 4, the shoe rim edge has the peripheral edge face 70 disposed normal to the face 32a of the sheet metal shoe 32. The brake shoe rim edge 60 of the sheet metal shoe portion 27 of the brake shoe 25 has its rim edge face similarly shaped.

From FIG. 4, it will therefore be noted that the rim edge 70 of the brake shoe 30 engages the angularly disposed brake shoe support area 75 in substantially line contact at the corner 105 of the rim edge 70. The rim edge 60 of the brake shoe 25 is similarly positioned, but in a reversed position from that illustrated in FIG. 4.

The line contact 105 between the rim edge 70 and the angularly disposed support pad area 75 will establish a minimum amount of friction between the brake shoe edge 70 and the support pad areas 72, 73 and 74 on which the edge 70 rests. This allows for a minimum effort in providing for movement of the brake shoes relative to the support pad areas.

Also, with each of the support pad areas 72, 73 and 74 having its respective planar face 75 disposed angularly toward the axis of the backing plate and therefore toward the axis of the brake drum, there will be a constant urgence of the brake shoe 30 toward the axis of the backing plate 10 and the brake drum 35 in a left-hand direction, as viewed in FIG. 1.

With the brake shoe 25 similarly supported on the brake shoe pad areas 62, 63 and 64 there will be a constant urgence of the brake shoe toward the axis of the backing plate and the brake drum in a right-hand direction, as viewed in FIG. 1.

Thus, with the line contact 105 between the rim edges 60 and 70 of the brake shoes providing for only a minimum degree of friction between the brake shoe edges and their respective support pad areas, and with the several support pad areas having their planar support faces angularly disposed toward the axis of the backing plate and therefore of the brake drum when the brake assembly is released after a brake application, the tendency will be for the brake shoe assembly to center itself relative to the axis of the backing plate and therefore relative to the axis of the brake drum. The arrangement is such therefore as to normally tend to move the brake shoes out of engagement with the brake drum after a brake application with a minimum degree of jouncing of the wheels and thereby eliminate a drag condition of either of the brake linings with the brake drum when the brake is not being applied.

While the embodiments of the present invention as herein disclosed constitute a preferred form, it is to be understood that other forms might be adopted.

What is claimed is as follows:

1. In a brake assembly for a friction type drum brake, the combination of, a backing plate, anchor means on said backing plate, brake shoe means having adjacent ends thereof engaging said anchor means pivotally supporting thereby the brake shoe means on said anchor means, and a plurality of brake shoe support pads on said backing plate each having a planar face engaged by an edge of said brake shoe means in support thereof on said pads, each of said planar faces being disposed angularly relative to the plane of the backing plate and inclined angularly downwardly toward the central area of the backing plate tending thereby always to urge said brake shoe means to a position concentric with the axis of the backing plate and thereby concentric with a brake drum in operable association with the backing plate.

2. In a brake assembly for a friction type drum brake, the combination of, a backing plate, anchor means on said backing plate, brake shoe means having adjacent ends thereof engaging said anchor means pivotally supporting thereby the brake shoe means on said anchor means, and a plurality of brake shoe support pads on said backing plate each having a planar face engaged by an edge of said brake shoe means in support thereof on said pads, each of said planar faces being disposed angularly relative to the plane of the backing plate and inclined downwardly toward the axis of the backing plate with the plane of the said faces intersecting the plane of the backing plate between the axis of the plate and the inner peripheral edge of the respective planar faces tending thereby always to urge said brake shoe means to a position concentric with the axis of the backing plate and thereby concentric with a brake drum in operable association with the backing plate.

3. In a brake assembly for a friction type drum brake, the combination of, a backing plate, anchor means on said backing plate, brake shoe means comprising generally circular shoe means with reinforcing web means normal to the shoe means arranged thereby in generally T-shaped cross section having adjacent ends of the said web means engaging said anchor means pivotally suspending thereby the brake shoe means on said anchor means, and a plurality of brake shoe support pads on said backing plate each having a planar face engaged by an edge of said brake shoe means in support thereof on said pads, resilient means between said brake shoe means and said backing plate resiliently retaining said edge in engagement with the planar faces of said pads, each of said planar faces being disposed angularly relative to the plane of the backing plate and inclined downwardly toward the axis of the backing plate with the plane of the said faces intersecting the plane of the backing plate between the axis of the plate and the inner peripheral edge of the respective planar faces tending thereby always to urge said brake shoe means to a position concentric with the axis of the backing plate and thereby concentric with a brake drum in operable association with the backing plate.

4. In a brake assembly for a friction type drum brake, the combination of, a backing plate, anchor means on said backing plate, brake shoe means comprising generally circular shoe means with reinforcing web means normal to the shoe means arranged thereby in generally T-shaped cross section having adjacent ends of the said web means engaging said anchor means pivotally suspending thereby the brake shoe means on said anchor means, and a plurality of brake shoe support pads on said backing plate each having a planar face engaged by an edge of said brake shoe means in support thereof on said pads, said edge forming an acute angle with the respective faces of said support pads forming thereby substantially line contact between the said edge and the said respective faces to reduce frictional contact therebetween to a minimum for ease of movement of the brake shoe means on said faces, resilient means between said brake shoe means and said backing plate resiliently retaining said edge in engagement with the planar faces of said pads, each of said planar faces being disposed angularly relative to the plane of the backing plate and inclined downwardly toward the axis of the backing plate with the plane of the said faces intersecting the plane of the blacking plate between the axis of the plate and the inner peripheral edge of the respective planar faces tending thereby always to urge said brake shoe means to a position concentric with the axis of the backing plate and thereby concentric with the brake drum in operable association with the backing plate.

5. In a brake assembly for a friction type brake drum, the combination of, a backing plate, anchor means on said backing plate, brake shoe means comprising a pair of arcuately shaped brake shoes each comprising an arcuately shaped sheet metal brake shoe portion secured on a reinforcing sheet metal web portion normal to the said shoe portion, said brake shoes having adjacent cooperating ends at one end thereof engaging an adjusting device retained between the said ends by spring means extending between the said ends and having adjacent cooperating ends at the opposite end thereof engaging said anchor means pivotally suspending thereby the brake shoes on said anchor means, retraction spring means connecting with said brake shoes to retain the said last mentioned ends thereof in engagement with said anchor means, and a plurality of brake shoe support pads on said backing plate for each of said shoes distributed over the length of the shoes each having a planar face engaged by an edge of the respective brake shoe on support thereof on said pads, resilient means between said brake shoe means and said backing plate resiliently retaining the respective edges of said shoes in engagement with the respective faces of said pads, each of said planar faces being disposed angularly relative to the plane of the backing plate and inclined downwardly toward the axis of the backing plate with the plane of the said faces intersecting the plane of the backing plate between the axis of the plate and the inner peripheral edge of the respective planar faces tending thereby always to urge said brake shoes to a position concentric wtih the axis of the backing plate and thereby concentric with a brake drum in operable association with the backing plate.

6. In a brake assembly for a friction type brake drum, the combination of, a backing plate, anchor means on said backing plate, brake shoe means comprising a pair of arcuately shaped brake shoes each comprising an arcuately shaped sheet metal brake shoe portion secured on a reinforcing sheet metal web portion normal to the said shoe portion, said brake shoes having adjacent cooperating ends at one end thereof engaging an adjusting device retained between the said ends by spring means extending between the said ends and having adjacent cooperating ends at the opposite end thereof engaging said anchor means pivotally suspending thereby the brake shoes on said anchor means, retraction spring means connecting with said brake shoes to retain the said last mentioned ends thereof in engagement with said anchor means, and a plurality of brake shoe support pads on said backing plate for each of said shoes distributed over the length of the shoes each having a planar face engaged by an edge of the respective brake shoe in support thereof on said pads, said edge of the respective brake shoe forming an acute angle with the respective faces of said support pads forming thereby substantially line contact between the said edge and the said respective faces to reduce frictional contact therebetween to a minimum for ease of movement of the brake shoe means on said faces, resilient means between said brake shoe means and said backing plate resiliently retaining the respective edges of said shoes in engagement with the respective faces of said pads, each of said planar faces being disposed angularly relative to the plane of the backing plate and inclined downwardly toward the axis of the backing plate with the plane of the said faces intersecting the plane of the backing plate between the axis of the plate and the inner peripheral edge of the respective planar faces tending thereby always to urge said brake shoe to a position concentric with the axis of the backing plate and thereby concentric with a brake drum in operable association with the backing plate.

References Cited in the file of this patent

UNITED STATES PATENTS

| 2,006,448 | Frank | July 2, 1935 |
| 2,880,824 | Austin et al. | Apr. 7, 1959 |